(12) United States Patent
Holcombe

(10) Patent No.: US 8,833,518 B2
(45) Date of Patent: Sep. 16, 2014

(54) PORTABLE, FOLDABLE TWO-LEGGED STOOL

(76) Inventor: William David Holcombe, Douglasville, GA (US)

( * ) Notice: Subject to any disclaimer, the term of this patent is extended or adjusted under 35 U.S.C. 154(b) by 853 days.

(21) Appl. No.: 12/211,812

(22) Filed: Sep. 17, 2008

(65) Prior Publication Data

US 2010/0065372 A1    Mar. 18, 2010

(51) Int. Cl.
*A01M 31/02* (2006.01)
*A47C 9/10* (2006.01)
*A47C 4/20* (2006.01)
*A47C 7/00* (2006.01)

(52) U.S. Cl.
CPC ... *A47C 9/10* (2013.01); *A47C 4/20* (2013.01); *A47C 7/008* (2013.01); *A01M 31/02* (2013.01)
USPC ........ 182/33; 182/187; 182/116; 297/440.24; 297/452.2; 297/423.39; 297/440.1; 297/461; 16/348

(58) Field of Classification Search
USPC ........... 182/187, 188, 33, 115, 116, 124–126, 182/169, 151; 297/440.24, 51, 451.2, 297/451.3, 4, 16.1, 16.2, 17, 195.11, 297/423.39, 423.41, 461, 452.1; 16/326, 16/327, 348; 248/166, 439, 440, 440.1, 248/123.11; 108/37, 115
See application file for complete search history.

(56) References Cited

U.S. PATENT DOCUMENTS

| | | | | |
|---|---|---|---|---|
| 2,711,783 A | * | 6/1955 | Prill | 108/115 |
| 3,067,975 A | * | 12/1962 | Wilcox | 248/694 |
| 3,264,033 A | * | 8/1966 | Hansburg | 297/423.39 |
| 3,336,999 A | * | 8/1967 | Mcswain | 182/20 |
| 3,927,733 A | * | 12/1975 | Wurn et al. | 182/187 |
| 4,029,278 A | | 6/1977 | Napoleon | |
| 4,535,559 A | * | 8/1985 | Hall | 42/94 |
| 4,676,547 A | | 6/1987 | Spillman | |
| 4,705,143 A | * | 11/1987 | Ziemba | 182/187 |
| 4,856,435 A | * | 8/1989 | Larson | 108/134 |
| 4,930,839 A | | 6/1990 | Saito et al. | |
| 5,083,324 A | * | 1/1992 | Strong | 4/460 |
| 5,188,424 A | | 2/1993 | Herron | |
| 5,197,381 A | * | 3/1993 | Mells | 108/44 |
| 5,210,888 A | * | 5/1993 | Canfield | 5/113 |
| 5,449,014 A | * | 9/1995 | Yan-ho | 135/95 |
| 5,494,333 A | * | 2/1996 | Wilson | 297/344.18 |

(Continued)

OTHER PUBLICATIONS

Definition of 'pad' provided in action the American Heritage® Dictionary of the English Language, Fourth Edition copyright © 2000 by Houghton Mifflin Company. Updated in 2009. Published by Houghton Mifflin Company. All rights reserved.*

*Primary Examiner* — Daniel Cahn

(74) *Attorney, Agent, or Firm* — Crose Law LLC; Bradley D. Crose

(57) ABSTRACT

The technology described herein provides a portable, foldable two-legged stool having a support legs assembly having two parallel support legs secured in a support frame having at least one horizontal brace and a seat assembly hingedly connected to a top of each of the support legs with a pivotal hinge assembly such that the stool is foldable for transport and is extendable for use as a two-legged stool when a rear edge of the seat assembly is placed against a generally vertical planar surface. This technology also provides a third leg assembly for selective use by an operator to add a third leg when no vertical planar surface is available upon which to support the rear edge of the seat assembly stool.

11 Claims, 21 Drawing Sheets

(56) References Cited

U.S. PATENT DOCUMENTS

| | | | | |
|---|---|---|---|---|
| 5,628,437 A * | 5/1997 | Kober | | 224/155 |
| 5,720,522 A * | 2/1998 | Habeck | | 297/337 |
| 5,845,743 A * | 12/1998 | Dechant | | 182/187 |
| 5,927,437 A * | 7/1999 | Fast | | 182/187 |
| 6,023,792 A * | 2/2000 | Croucher et al. | | 4/484 |
| 6,062,638 A | 5/2000 | Ferguson | | |
| 6,155,646 A | 12/2000 | Sisson | | |
| 6,173,660 B1 * | 1/2001 | Emmert | | 108/90 |
| 6,176,545 B1 | 1/2001 | Hambleton | | |
| 6,485,095 B2 * | 11/2002 | Haubeil | | 297/16.1 |
| 6,510,922 B1 * | 1/2003 | Hodnett | | 182/187 |
| 6,729,685 B1 * | 5/2004 | Ebalobor | | 297/14 |
| 6,820,928 B1 * | 11/2004 | Ransom | | 297/29 |
| 7,052,080 B2 * | 5/2006 | Knight et al. | | 297/4 |
| 7,121,620 B1 * | 10/2006 | Fang | | 297/51 |
| 7,163,084 B1 * | 1/2007 | Blehm | | 182/172 |
| D536,889 S * | 2/2007 | Self et al. | | D6/362 |
| 7,290,552 B1 * | 11/2007 | Eisbrenner | | 135/90 |
| 7,340,801 B2 * | 3/2008 | Yamaguchi | | 16/368 |
| 2002/0145311 A1 * | 10/2002 | Haubeil | | 297/16.1 |
| 2005/0044664 A1 * | 3/2005 | Chang | | 16/327 |
| 2005/0151408 A1 * | 7/2005 | Pratte et al. | | 297/423.39 |
| 2009/0015040 A1 * | 1/2009 | Redmann | | 297/16.1 |

* cited by examiner

PORTABLE, FOLDABLE TWO-LEGGED STOOL

FIELD OF THE INVENTION

The technology described herein relates generally to seating devices for hunting, spectator events, and the like. More specifically, this technology relates to a portable, foldable stool having two legs and a seat, wherein the seat is contacted with a vertical surface for overall support of the stool.

BACKGROUND OF THE INVENTION

Many types and varieties of stools and chairs are known in the art. Portable seating devices provide a user the ability to carry a lightweight seat to a spectator event, a hunting event, outdoor activities, social gatherings, and the like. Such seating devices provide one with relief from lengthy standing.

Related patents known in the art include the following: U.S. Pat. No. 4,029,278, issued to Napoleon on Jun. 14, 1977, discloses a folding stool with leveling leg. U.S. Pat. No. 4,676,547, issued to Spillman on Jun. 30, 1987, discloses a portable spectator's stool. U.S. Pat. No. 4,930,839, issued to Saito et al. on Jun. 5, 1990, discloses a single-legged chair. U.S. Pat. No. 5,188,424, issued to Herron on Feb. 23, 1993, discloses a portable seat. U.S. Pat. No. 5,720,522, issued to Habeck on Feb. 24, 1998, discloses a portable seat. U.S. Pat. No. 6,062,638, issued to Ferguson on May 16, 2000, discloses a portable stool. U.S. Pat. No. 6,155,646, issued to Sisson on Dec. 5, 2000, discloses a portable stool. U.S. Pat. No. 6,176,545, issued to Hambleton on Jan. 23, 2001, discloses a portable stool.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a portable, foldable stool having two legs and a seat, wherein the seat is contacted with a vertical surface for overall support of the stool.

In one exemplary embodiment, the technology described herein provides a folding stool. The folding stool includes a support legs assembly having two parallel support legs secured in a support frame having at least one horizontal brace and a seat assembly hingedly connected to a top of each of the support legs with a pivotal hinge assembly such that the stool is foldable for transport and is extendable for use as a two-legged stool when a rear edge of the seat assembly is placed against a generally vertical planar surface. The stool includes an adjustable carrying strap connected to the seat assembly.

The stool includes a locking mechanism disposed within the pivotal hinge assembly such that the stool locking mechanism is selectively engaged into place and is prevented from collapsing while unfolded and in use as a stool. The stool locking mechanism is selectively disengaged in order to fold the stool for transport.

Each of the two parallel support legs of the support legs assembly further includes a hollow channel configured to receive the pivotal hinge assembly secured to the seat assembly, and two holes and two rivet pins to place through the two holes and securely hold the pivotal hinge assembly and seat assembly in place with the support legs assembly. The support legs assembly and the seat assembly can be lightweight, hollow tube aluminum. Any exposed, open end of the hollow tube aluminum in the seat assembly is sealed with a protective plug.

The seat assembly further comprises a left side brace, a right side brace, and front brace, and a rear brace fabricated generally in a square and upon which a seat base and a seat pad is disposed and secured. The weight of a user seated upon the folding stool is distributed both downwardly through the support legs assembly toward a surface underneath the support legs assembly and horizontally through the seat assembly toward the vertical planar surface. Each of the support legs further comprises an end cap for contact between each support leg and a surface underneath, wherein each end cap aids in the prevention of sliding on smooth surfaces, and wherein each end cap is height-adjustable, and level-adjustable to accommodate unevenness in the surface underneath.

In another exemplary embodiment, the technology described herein provides a portable, foldable stool having a third leg assembly. The stool having a third leg assembly includes a support legs assembly having two parallel support legs secured in a support frame having at least one horizontal brace, a seat assembly hingedly connected to a top of each of the support legs with a pivotal hinge assembly such that the stool is foldable for transport and is extendable for use as a two-legged stool when a rear edge of the seat assembly is placed against a generally vertical planar surface, and a third leg assembly for selective use by an operator to add a third leg when no vertical planar surface is available upon which to support the rear edge of the seat assembly stool.

The third leg assembly further includes a leg and a leg extension slidably disposed within the leg and operatively extendable. The leg of the third leg assembly further includes a hitch pin and hitch pin holes and the leg extension further comprises a plurality of hitch pin holes, one of which is selected to receive the hitch pin as it secures the leg and leg extension at a desired height. The leg assembly further includes a leg stabilizer disposed upon a top of the leg assembly and configured for connectivity with an underside of the seat assembly. The seat assembly further comprises a third leg stabilizer channel into which the leg stabilizer of the third leg assembly is placed either perpendicular to the seat assembly for use as a three-legged stool or parallel to the seat assembly for storage and transport when not in use. The third leg stabilizer channel of the seat assembly further includes a retainer to hold securely the third leg assembly in place. The third leg assembly further includes an end cap for contact between the third leg assembly and a surface underneath.

In yet another exemplary embodiment, the technology described herein provides a method of seating utilizing a foldable stool. The method includes utilizing a folding stool comprising a support legs assembly having two parallel support legs secured in a support frame having at least one horizontal brace and a seat assembly hingedly connected to a top of each of the support legs with a pivotal hinge assembly such that the stool is foldable for transport and is extendable for use as a two-legged stool when a rear edge of the seat assembly is placed against a generally vertical planar surface, operatively unfolding the stool and placing the rear edge of the seat assembly against the generally vertical planar surface, selectively sitting upon the seat assembly, wherein a weight of a user seated upon the folding stool is distributed both downwardly through the support legs assembly toward a surface underneath the support legs assembly and horizontally through the seat assembly toward the vertical planar surface, and operatively folding the stool for transport after use.

The method can further include utilizing the folding stool, the folding stool further having a third leg assembly having a leg stabilizer for selective use by an operator to add a third leg when no vertical planar surface is available upon which to support the rear edge of the seat assembly stool and the seat assembly further comprising a third leg stabilizer channel into which the leg stabilizer of the third leg is placed, operatively placing the leg stabilizer of third leg assembly into the third leg stabilizer channel such that the third leg is perpendicular to the seat assembly and provides a third support to the stool, selectively sitting upon the seat assembly, wherein a weight of a user seated upon the folding stool is distributed both downwardly through the support legs assembly toward a surface underneath the support legs assembly and the third leg assembly, and operatively removing the third leg assembly after use and storing the third leg assembly under the seat assembly parallel to the seat assembly.

The method can further include utilizing the folding stool, the folding stool further including a locking mechanism disposed within the pivotal hinge assembly, selectively engaging the locking mechanism to hold the stool securely in place while unfolded and in a use position to prevent collapse, and selectively disengaging the locking mechanism in order to fold the stool for transport.

The method can further include utilizing the folding stool, the folding stool further including a retainer disposed upon the third leg stabilizer channel of the seat assembly and operatively securing the third leg assembly in place with the seat assembly utilizing the retainer.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a portable, foldable stool having two legs and a seat, wherein the seat is contacted with a vertical surface for overall support of the stool.

Figure 1:
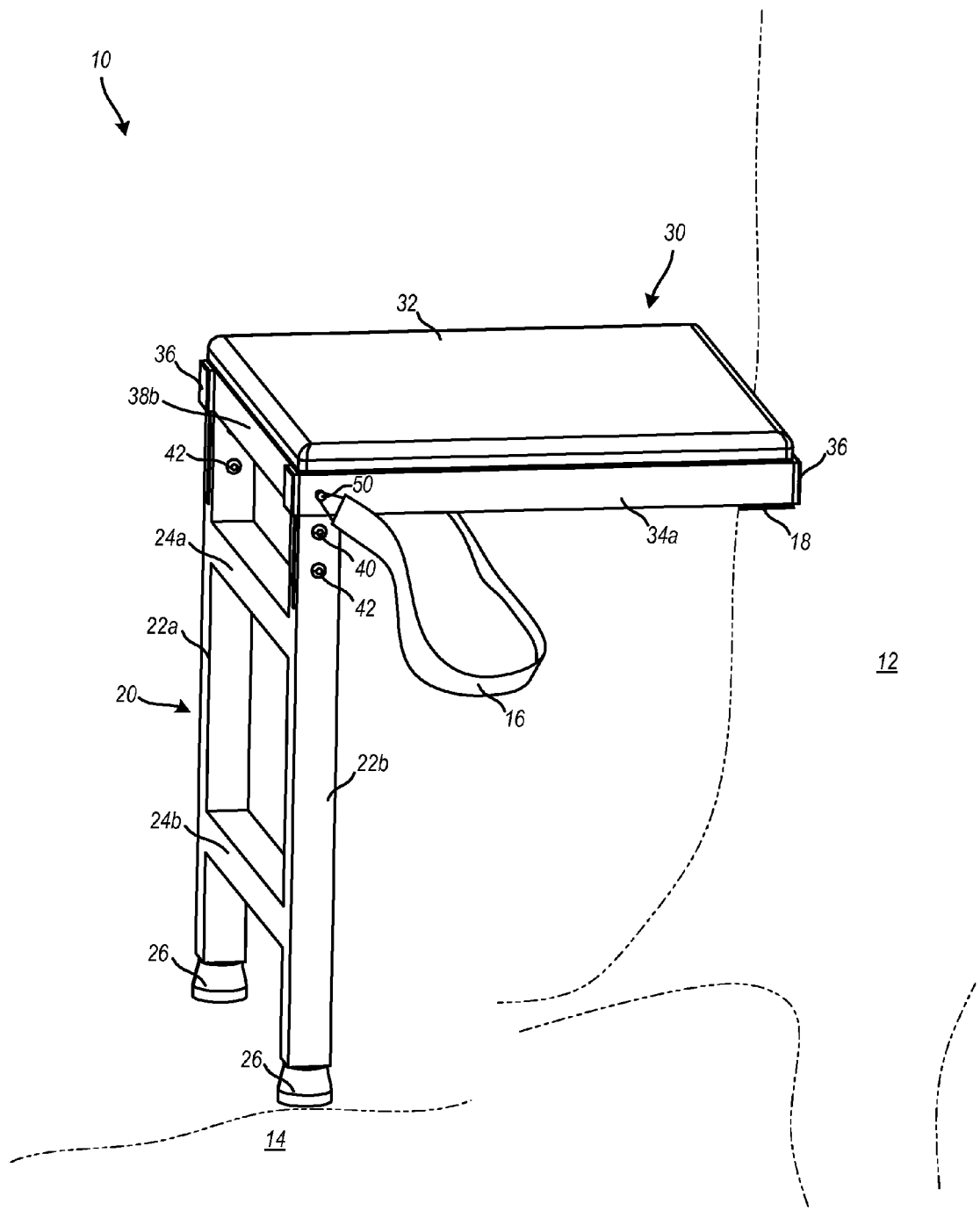
FIG. 1 is a side perspective view of a portable, foldable two-legged stool illustrating, in particular, a seating assembly, a support legs assembly, a shoulder carrying strap, and a seat position shown in use against a generally vertical planar surface.
Figure 2:
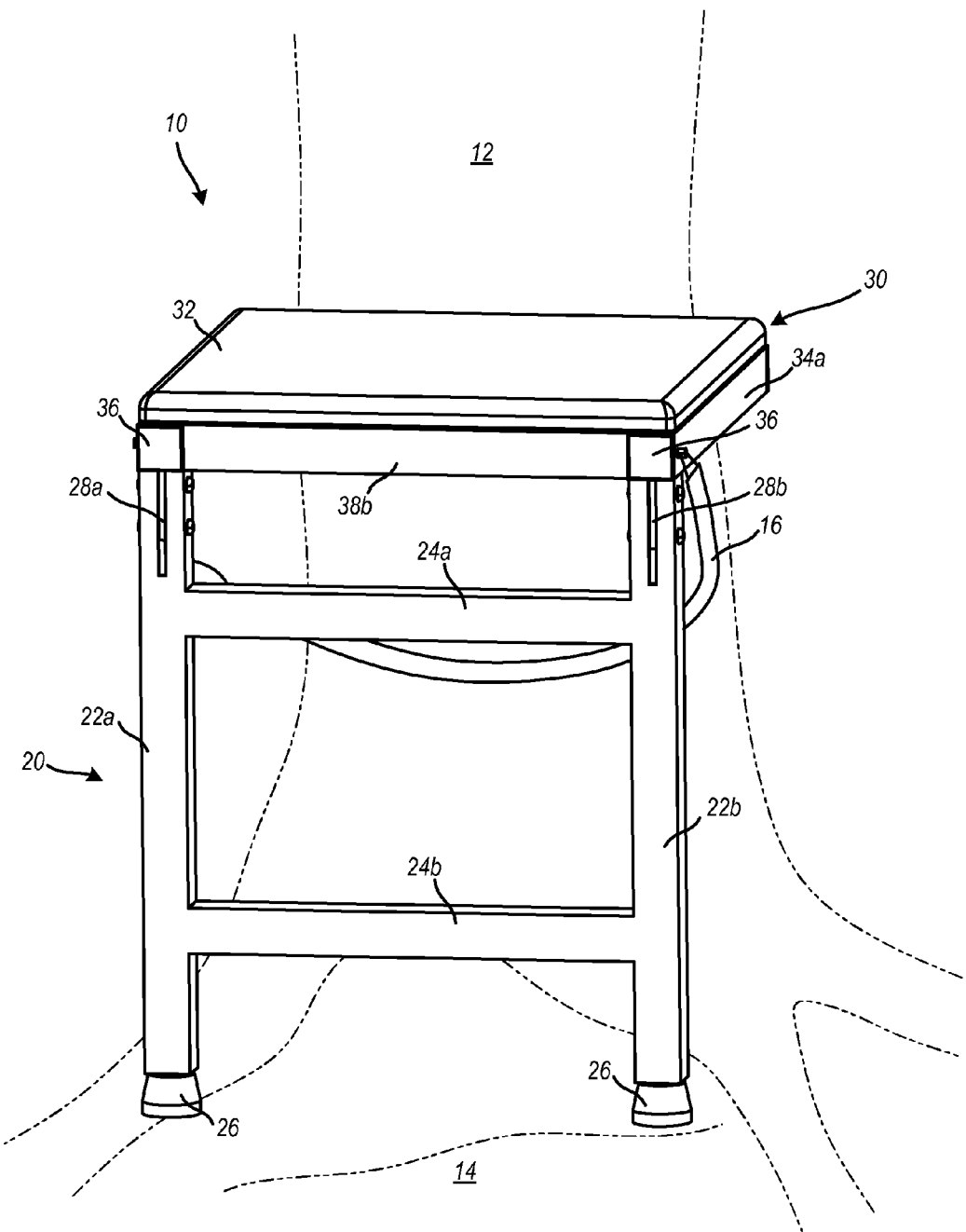
FIG. 2 is a front perspective view of the stool of FIG. 1.

Referring now to FIGS. 1 and 2, a stool 10 having a support legs assembly 20 and a seat assembly 30 is shown. As shown, the stool 10 is a lightweight, portable, and foldable two-legged stool to provide a user the ability to carry a lightweight seat to a spectator event, hunting event, outdoor activity, social gathering, or the like. Such a seating device 10 provides one with relief from lengthy standing. The stool 10 is configured for both a rapid setup and take down. The stool 10 is easily leveled to provide both comfort and versatility even on rough, uneven terrains. As shown the stool 10 is placed upon an uneven ground surface 14 and against a generally vertical planar surface 12, such as a tree, or the like. However, the stool 10 can be utilized in both indoor and outdoor settings. The stool 10 includes a carrying strap 16. The carrying strap 16 is tethered to the seat assembly 30 such that it can swivel. The strap 16 is utilized to carry the stool 10 while in transit. The strap 16 can be utilized over a shoulder of the carrier, for example. The strap 16 can be leather, fabric, or the like and attached to the seat assembly 30 with a fastener 50 on each side 34a, 34b (34b not shown). The strap 16 further can include a buckle with which a user can adjust the length of the strap. The fastener 50 is configured to swivel and move as needed as the strap 16 is rotated or otherwise moved. The fastener 50 is configured, for example, to attach to the seat assembly 30 with a fastener screw and washer.

The support legs assembly 20 includes two parallel support legs 22a, 22b, secured in a support frame having at least one horizontal brace. As shown, the support legs assembly 20 includes two horizontal braces 24a, 24b. The two parallel support legs 22a, 22b and the two horizontal braces 24a, 24b can be fabricated from lightweight, hollow tube aluminum. By way of example, hollow tube aluminum having an outer diameter of one inch, an inside perimeter of approximately ⅞ of an inch, and a wall thickness of ¹⁄₁₆ of an inch can be utilized. Materials utilized are designed to fabricate a stool 10 configured to hold a person up to approximately 300 pounds in weight. Other lightweight, strong materials can be utilized. The two parallel support legs 22a, 22b and the two horizontal braces 24a, 24b can be welded together or integrally formed. The two parallel support legs 22a, 22b include caps 26 on the feet to prevent sliding of the support legs assembly 20 on surface 14. The caps 26 can be rubber, plastic, or the like, and can be attached by gluing or other secure means.

Near the top of each support leg 22a, 22b is an upper pivotal rivet 40 and a lower locking rivet 42. The upper pivotal rivet 40 provides a pivot point about which a pivotal hinge assembly (internal to the support legs assembly 20 and seat assembly 30 and shown in later figures) connecting the seat assembly 30 to the support legs assembly 20 pivots and allows folding of the stool 10. The lower locking rivet 42 provides a locking point about which the pivotal hinge assembly locks to hold the stool 10 in place for use to ensure that the stool 10 does not collapse while in use.

Also near the top of each support leg 22a, 22b is a hollow channel, 28a, 28b, respectively, passing through the walls of each support leg 22a, 22b and into which the pivotal hinge assembly slides to mount. By way of example, each hollow channel 28a, 28b is centered and parallel with the inside and outside walls of each support leg 22a, 22b. In one embodiment, for example, each hollow channel 28a, 28b is approximately ⁵⁄₃₂ of an inch wide, one inch deep, and two and three quarters inch long in order to receive the lower end of the pivotal hinge assembly. Dimensions can vary.

The seat assembly 30 includes a padded seat 32 disposed upon a seat base (not shown) and supported within a seat frame having four supports, a right side 34a, a front 38b, a rear 38a (not shown) and a left side 34b (not shown). The seat frame supports 34a, 34b, 38a, 38b can be fabricated from lightweight, hollow tube aluminum. Other lightweight materials can be utilized. At each opposite end of the right side 34a and the left side 34b is placed a plug 36 to cover the cavity in the hollow tube aluminum and to protect a user from any sharp edges. The plug 36 is, for example, a nylon filler plug of approximately one inch length and width and one-half inch in depth.

The seat assembly 30 also includes a silencer pad 18. The silencer pad 18 is utilized to prevent the seat assembly 30 from slamming into the support legs assembly 20 upon folding or transporting. Additionally, the silencer pad 18 provides a cushioning between the seat assembly 30 and the support legs assembly 20. The silencer pad 18 can be plastic, rubber, or the like such that it provides cushioning between the seat assembly 30 and the support legs assembly 20. By way of example, the silencer pad 18 is 2" L×¾" W×⅜" D square pad.

Figure 3:
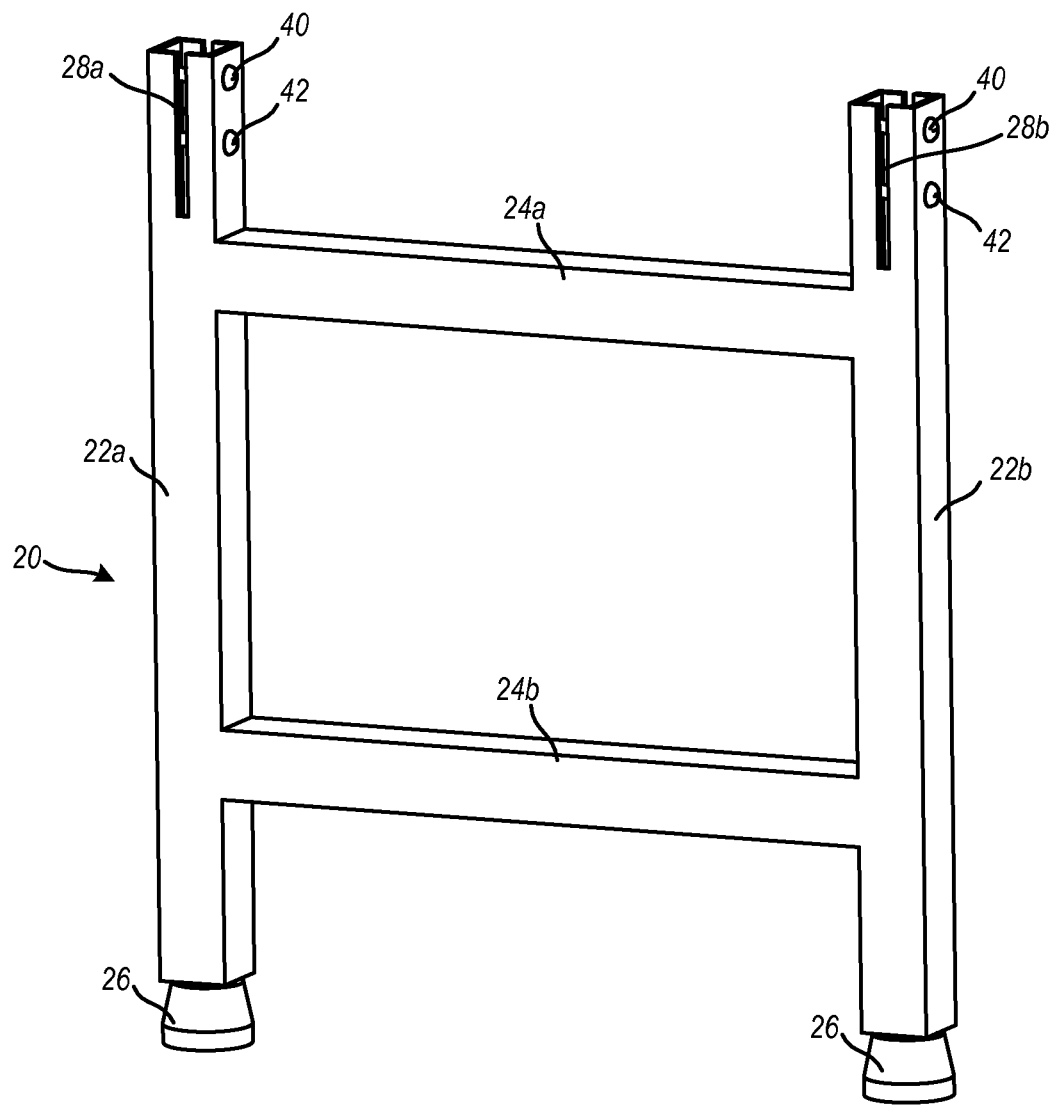
FIG. 3 is a front perspective view of the support legs assembly of the stool of FIG. 1.
Figure 4:
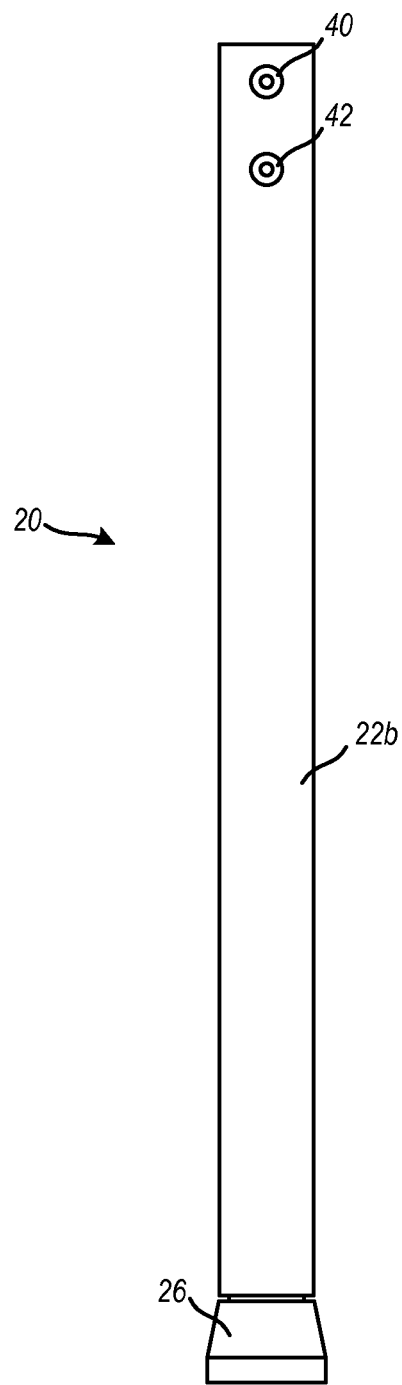
FIG. 4 is a side planar view of the support leg assembly of the stool of FIG. 1.

Referring now to FIGS. 3 and 4, the support legs assembly 20 is shown in further detail, from a front view and side view, respectively. The support legs assembly 20 includes two parallel support legs 22a, 22b, secured in a support frame having horizontal braces 24a, 24b. The two parallel support legs 22a, 22b include caps 26 on the feet to prevent sliding of the support legs assembly 20. The caps 26 can be, for example, one inch in length and having a diameter of ⅞ of an inch and made of rubber. By way of example, each of the two parallel support legs 22a, 22b is approximately sixteen inches in length and each of the horizontal braces 24a, 24b is approximately twelve inches in length. Dimensions can vary. Welding can be utilized to join these components at, for example, locations three and a half inches below the top of the support legs 22a, 22b and three and a half inches above the feet of the support legs 22a, 22b. Alternatively, these components can be integrally formed.

Each support leg 22a, 22b includes an upper pivotal rivet 40 and a lower locking rivet 42 for pivoting and locking the pivot hinge assembly. Each support leg 22a, 22b also includes a hollow channel, 28a, 28b, respectively, passing through the walls of each support leg 22a, 22b and into which the pivotal hinge assembly slides to mount.

The upper pivotal rivet 40 and lower locking rivet 42 each pass through holes within the two parallel support legs 22a, 22b and a lower hinge of the pivot hinge assembly to securely connect the pivot hinge assembly to the support legs assembly 20 and provide points about which to pivot and lock. Each top hole for the upper pivotal rivet 40 is, for example, one quarter inch to five sixteenths inch in diameter, centered, and located three quarters of an inch from a top of the support leg 22a, 22b. Each lower hole for the lower locking rivet 42 is, for example, one quarter inch to five sixteenths inch in diameter, centered, and located two and three eighths inches from the top of the support leg 22a, 22b.

Figure 5:
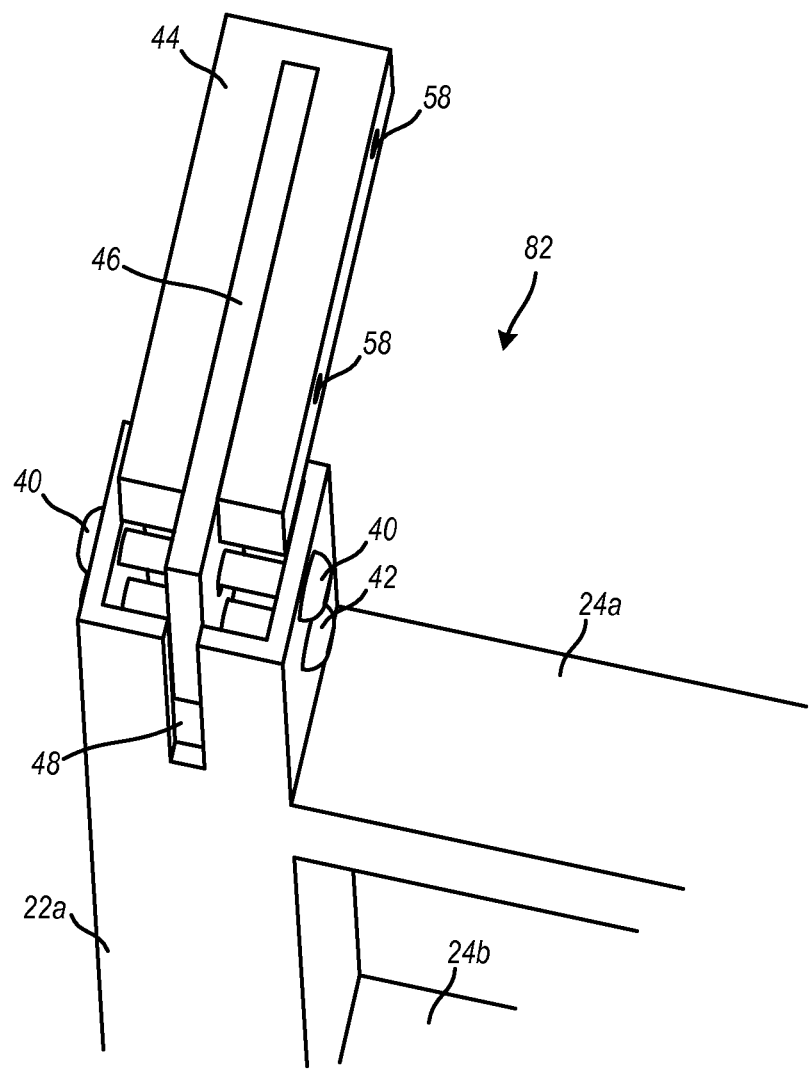
FIG. 5 is a top perspective view of a pivotal hinge assembly for connecting the support legs assembly to the seat.
Figure 6:
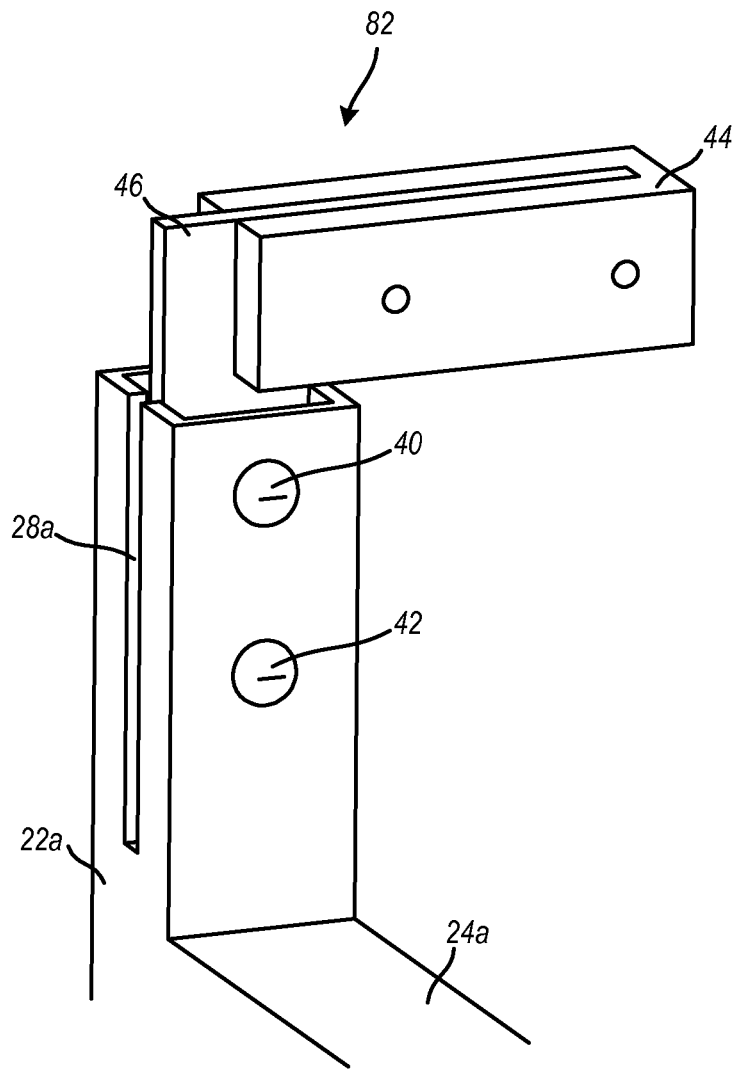
FIG. 6 is a side perspective view of the pivotal hinge assembly depicted in FIG. 5.
Figure 13:
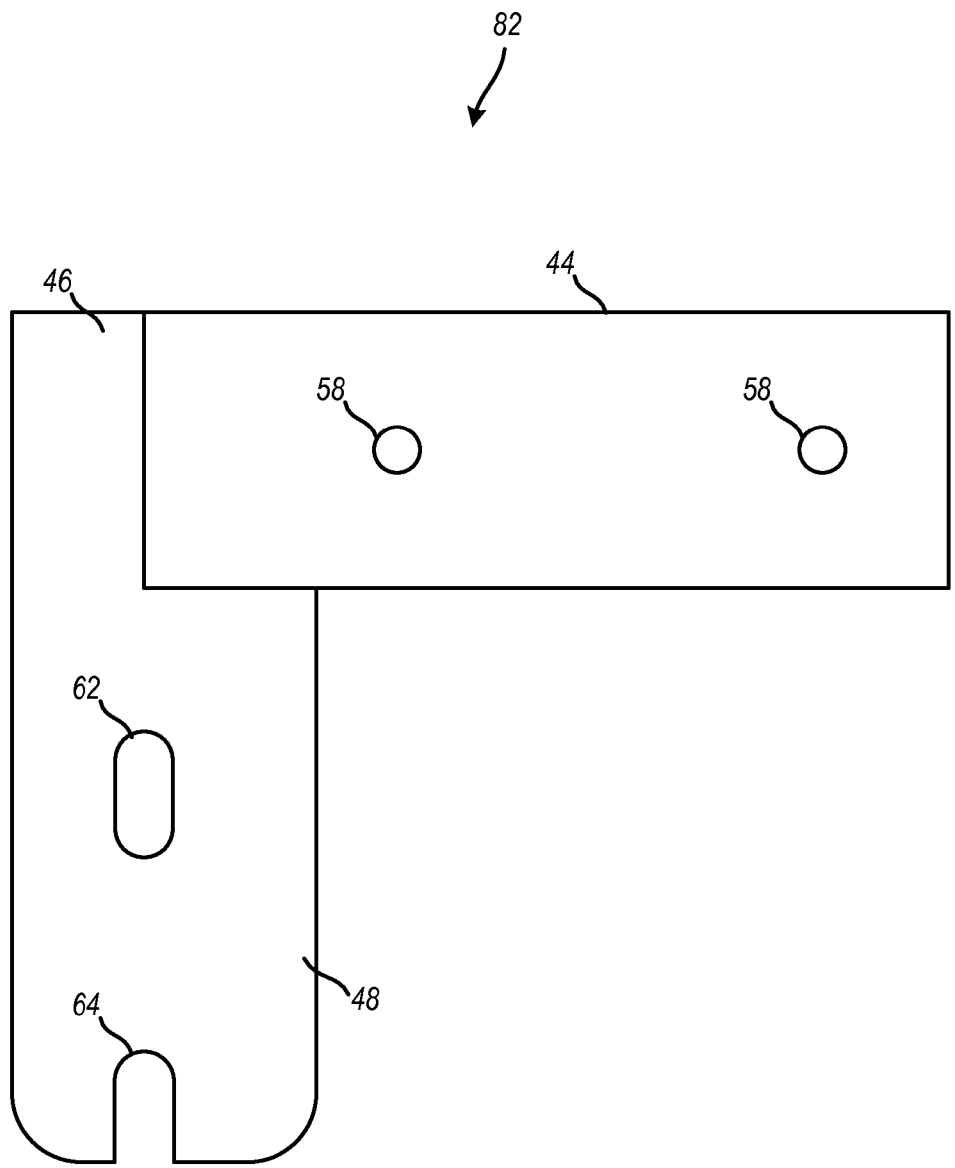
FIG. 13 is a side planar view of the pivotal hinge assembly depicted in FIG. 5.

Referring now to FIGS. 5, 6, and 13 a pivotal hinge assembly 82 for connecting the support legs assembly 20 to the seat assembly 30 is shown in top and side perspective views and side planar view, respectively. The pivotal hinge assembly 82 includes a lower hinge body 48 and an upper hinge body 46.

The lower hinge body 48 is placed within each hollow channel 28a, 28b of each support leg 22a, 22b of the support legs assembly 20. The lower hinge body 48 includes upper pivotal rivet hole 62, through which upper pivotal rivet 40 is placed to provide a pivot point. The upper pivotal rivet hole 62 is, for example, ⁵⁄₁₆" W×¹¹⁄₁₆" L×⅛" D. The lower hinge body 48 also includes a lower locking rivet hole 64, through which the lower locking rivet 42 is placed to lock the seat assembly 30 in position relative to the support legs assembly 20 while in use as a stool 10. The lower locking rivet hole 64 is, for example, 5/16" W×7/16" L×1/8" D. The lower hinge body 48 is, for example, 7/8" W×3½" L×1/8" D.

The upper hinge body 46 is placed with the side frame supports 34a, 34b of the seat assembly 30. Surrounding the upper hinge body 46 is a filler 44 that provides for secure placement of the upper hinge body 46 as it is slid within the side frame supports 34a, 34b of the seat assembly 30. The filler 44 is, for example, a composite filler material. The filler 44 is secured to the upper hinge body 46 with glue or the like. Alternatively, the upper hinge body 46 and the filler 44 both include safety pin holes 58 to receive safety pins flush with an outside edge of the filler 44. The safety pins are, for example, 1/8" diameter pins 7/8" in length. The upper hinge body 46 is, for example, 1" W×3½" L×1/8" D.

Figure 7:
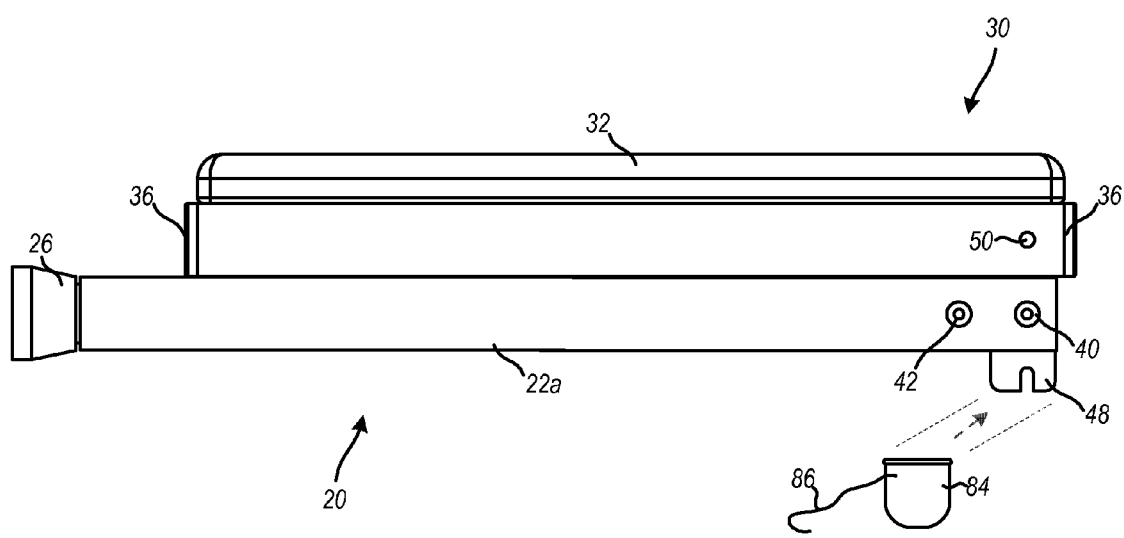
FIG. 7 is a side planar view of the seat assembly and support legs assembly, illustrating, in particular a folded position for transport and storage.
Figure 8:
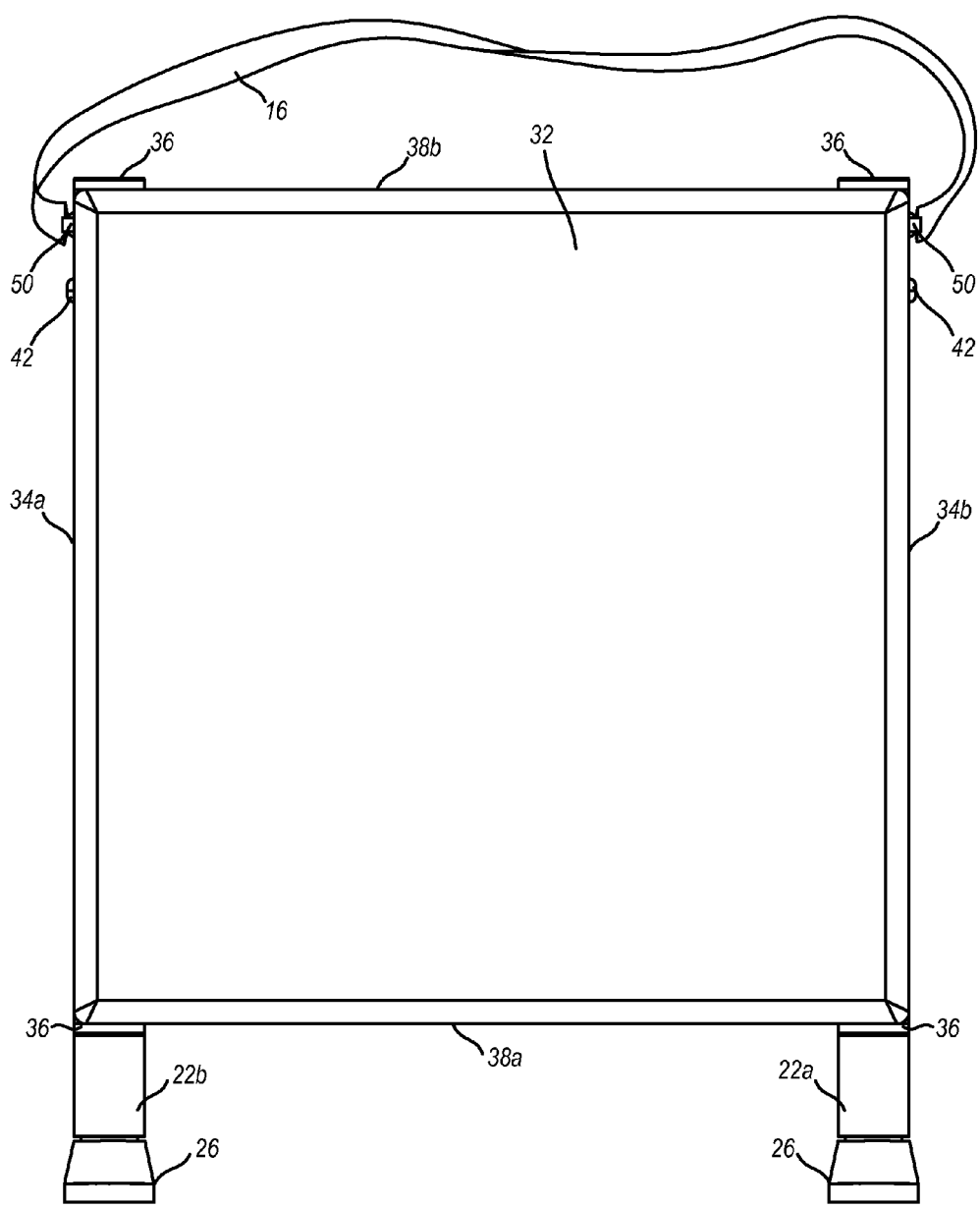
FIG. 8 is a top planer view the seat assembly, support legs assembly, and shoulder carrying strap.
Figure 9:
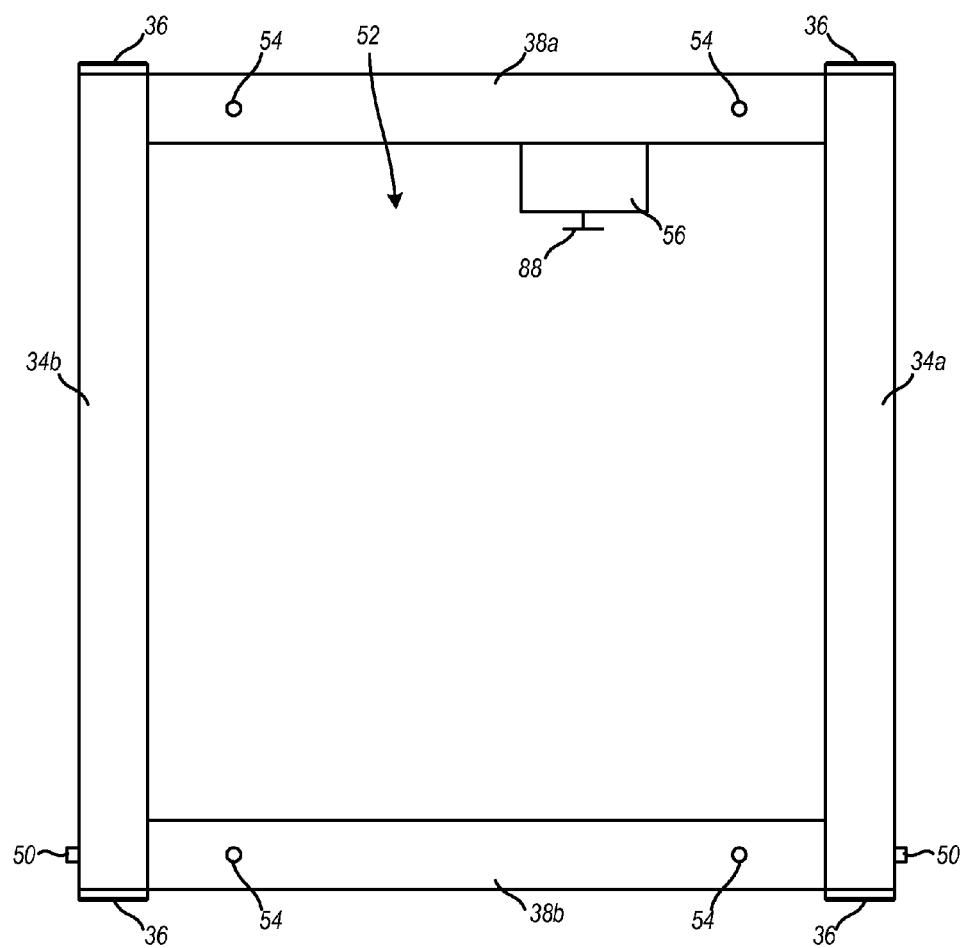
FIG. 9 is a top planar view of a seat support frame utilized within the seat assembly.
Figure 10:
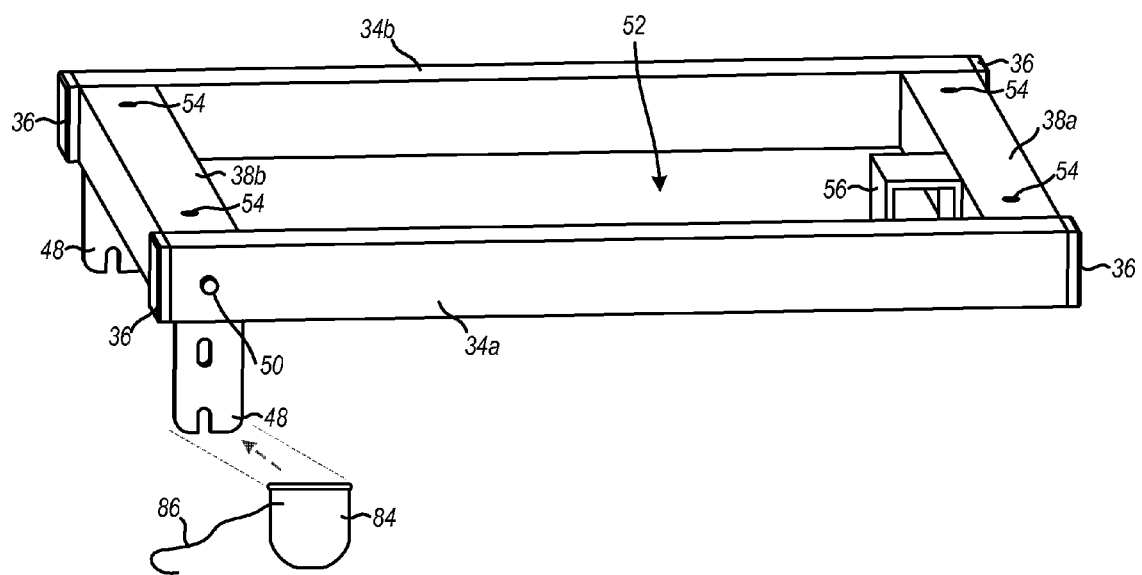
FIG. 10 is a side perspective view of the seat support frame of FIG. 9.
Figure 11:
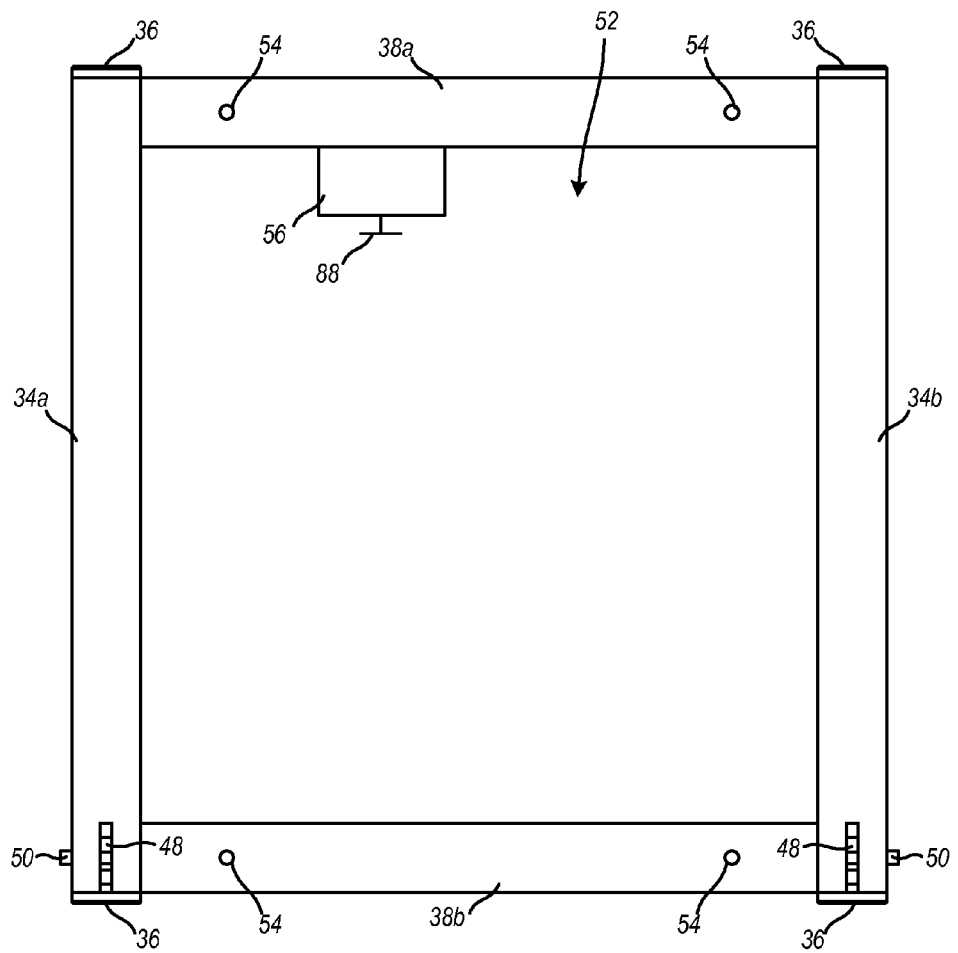
FIG. 11 is a bottom planar view the seat support frame of FIG. 9.
Figure 12:
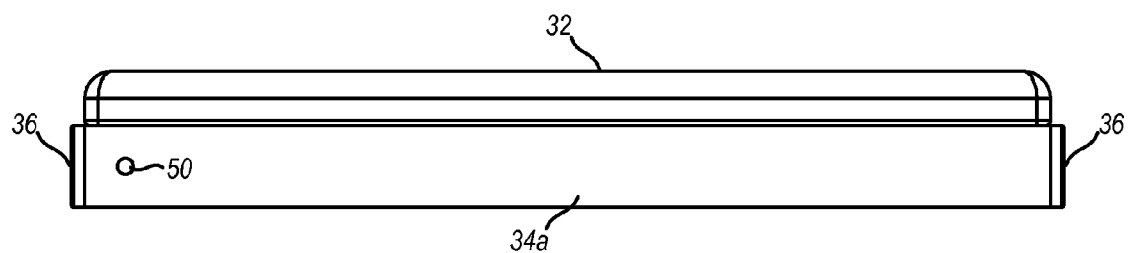
FIG. 12 is a side planar view of the padded seat assembly.

Referring now to FIGS. 7 and 8, the seat assembly 30 is shown with the support legs assembly 20 in a folded position for storage and transport, from a left-side view and top view respectively. The seat assembly 30 includes a padded seat 32 disposed upon a seat base (not shown) and supported within a seat frame having four supports, a right side 34a, a front 38b, a rear 38a and a left side 34b. The padded seat 32 is made with an all-weather design and water-resistant material. Beneath the padded seat cover is a comfortable, durable seat padding material and a seat base upon which it rests. The padded seat 32 can for example, be camouflage. The padded seat 32, seat padding material, and seat base can be joined together utilizing, for example, seat anchor screws and seat anchor bolts. At each opposite end of the right side 34a and the left side 34b is placed a plug 36 to cover the cavity in the hollow tube aluminum and to protect a user from any sharp edges.

The seat assembly 30 includes a carrying strap 16. The carrying strap 16 is tethered to the seat assembly 30 such that it can swivel. The strap 16 is utilized to carry the stool 10 while in transit. The strap 16 can be utilized over a shoulder of the carrier, for example. The strap 16 can be leather, fabric, or the like and attached to the seat assembly 30 with a fastener 50 on each side 34a, 34b.

The support legs assembly 20 includes two parallel support legs 22a, 22b, secured in a support frame. The two parallel support legs 22a, 22b include caps 26 on the feet to prevent sliding of the support legs assembly 20. Each support leg 22a, 22b includes an upper pivotal rivet 40 and a lower locking rivet 42 for pivoting and locking the pivot hinge assembly. The lower hinge body 48 is exposed slightly when the stool 10 is in a folded, transportable position and not locked into position with support legs 22a, 22b of the support legs assembly 20. Safety hinge cover 84 is utilized to cover the exposed portion of lower hinge body 48 when the stool 10 is in a folded position. A safety hinge cover anchor tie 86 is included to secure the safety hinge cover 84 to the stool 10.

Referring now to FIGS. 9, 10, 11, and 12, a seat frame of the seat assembly 30 is shown. The seat assembly 30 includes a padded seat 32. The seat frame includes four supports, a right side 34a, a front 38b, a rear 38a and a left side 34b. At each opposite end of the right side 34a and the left side 34b is placed a plug 36 to cover the cavity in the hollow tube aluminum and to protect a user from any sharp edges. A fastener 50 is shown on each side 34a, 34b, whereupon a carrying strap 16 can be attached. Located on both the front 38b and rear 38a frame supports are seat base holes 54 through which the seat base is secured to the frame supports 38b, 38a utilizing seat anchor screws or seat anchor bolts. Located upon the rear support 38a is a third leg stabilizer channel 56. The third leg stabilizer channel 56 provides a secure area into which to place the third leg assembly (shown specifically in FIGS. 18, 19, 20, 21) for storage or use as a third leg support. Area 52 in which the seat base is placed is shown within the perimeter of the frame supports 34a, 34b, 38a, 34b. The lower hinge body 48 is exposed slightly when the stool 10 is in a folded, transportable position and not locked into position with support legs 22a, 22b of the support legs assembly 20. The holes 54 provide for a connection point between the seat frame, set base, and padded seat 32.

Figure 14:
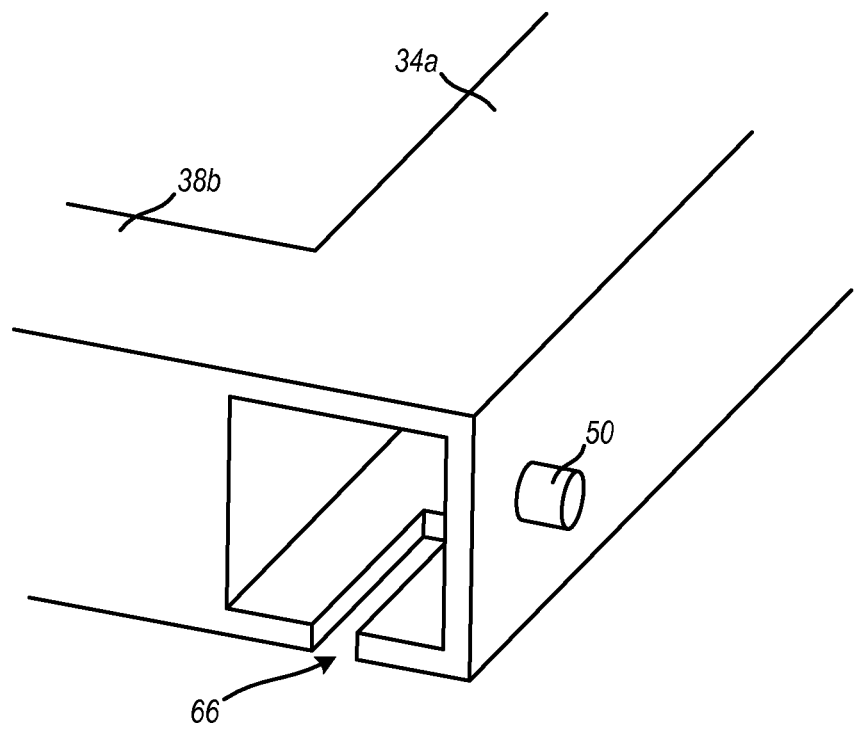
FIG. 14 is a front perspective view of the seat support frame of the seat assembly illustrating, in particular, the hollow channel for receiving the pivotal hinge assembly.
Figure 15:
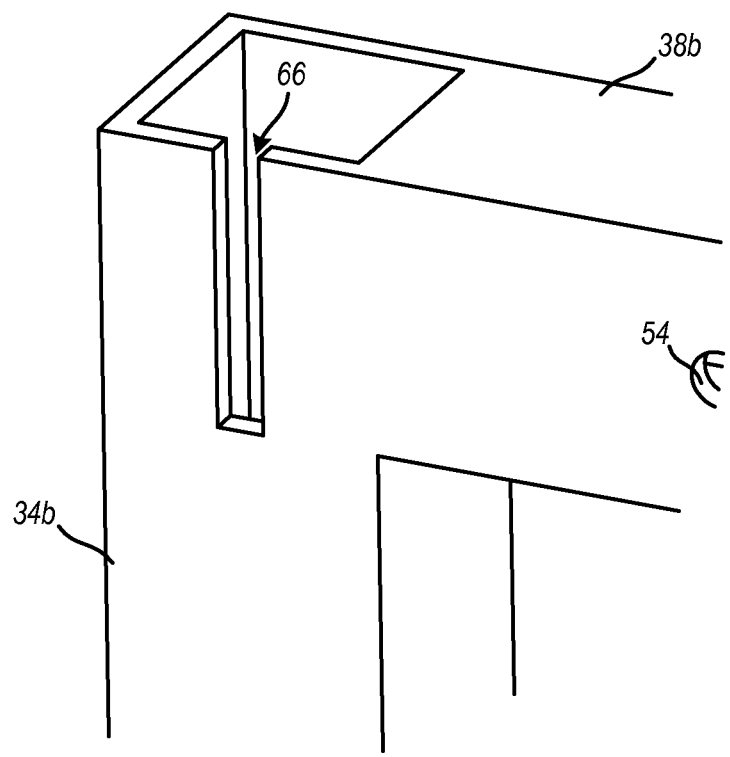
FIG. 15 is a bottom perspective view of the seat support frame of the seat assembly illustrating, in particular, the hollow channel for receiving the pivotal hinge assembly.

Referring now to FIGS. 14 and 15, the frame of seat assembly 30 is shown illustrating, in particular, the hollow channel 66 for the pivotal hinge assembly 82 (not shown). Each front corner of the seat frame, specifically at the intersections of front support 38b with each side support 34a, 34b, includes hollow channel 66 to receive the pivotal hinge assembly 82 as it is slid in and secured.

Figure 16:
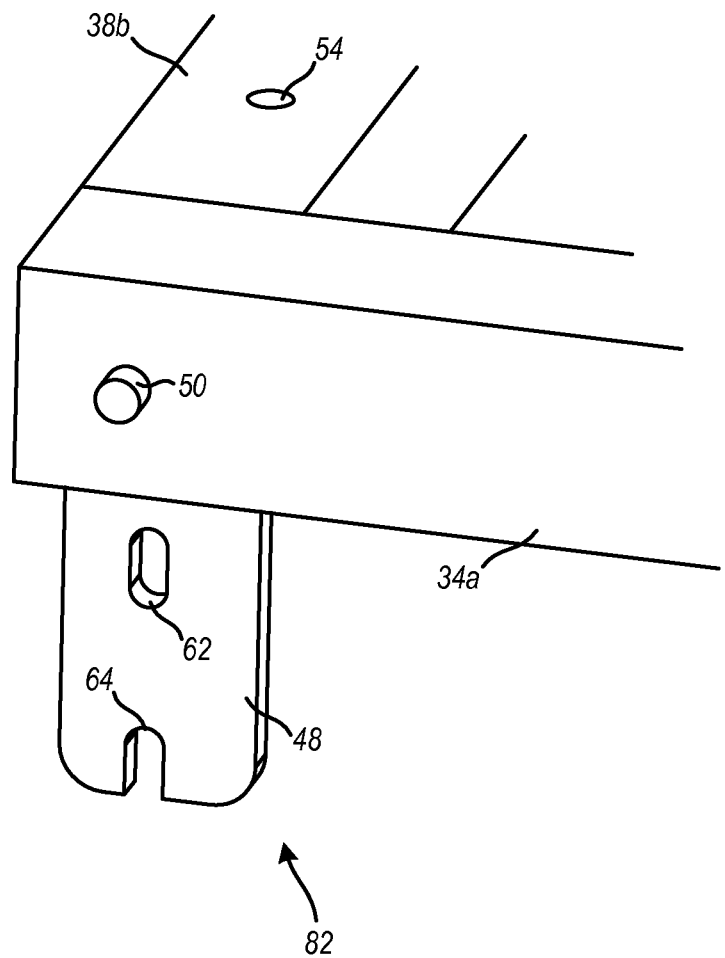
FIG. 16 is a perspective view of the seat support frame illustrating, in particular the pivotal hinge assembly disposed within and the lower hinge body ready for insertion in the right support leg of the support legs assembly.
Figure 17:
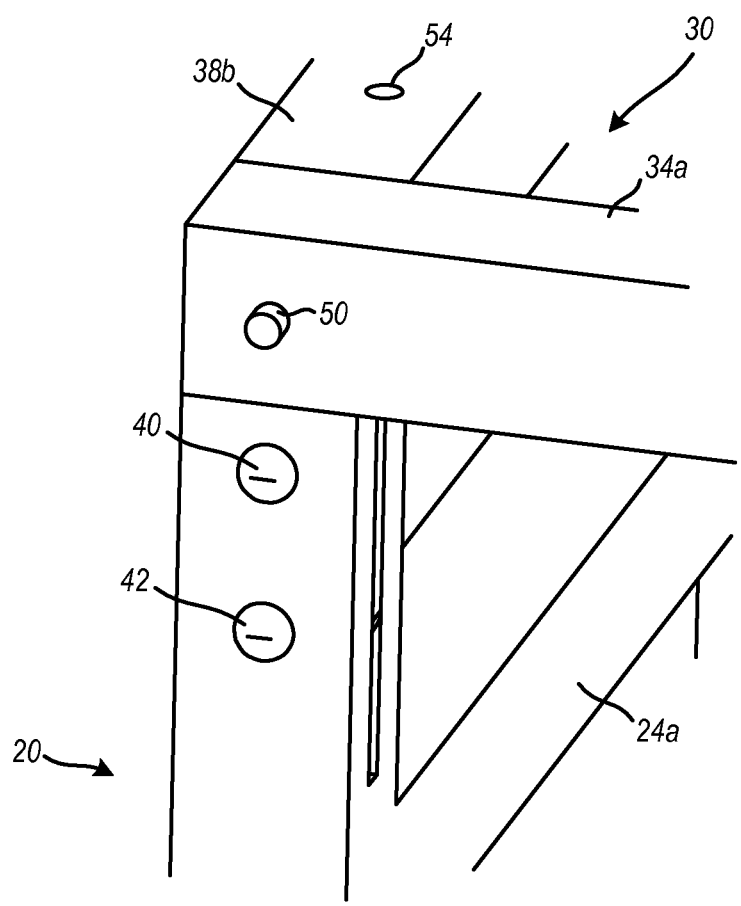
FIG. 17 is a perspective view of the seat support frame illustrating, in particular the pivotal hinge assembly disposed within and attached to both the seat assembly and the support legs assembly.

Referring now to FIGS. 16 and 17, the frame of seat assembly 30 is shown illustrating, in particular, placement of the pivotal hinge assembly 82 in the hollow channel 66 in each side support 34a, 34b. Front support 38b and right side support 34a are shown. Prior to placement within the support legs assembly 20, the lower hinge body 48, having an upper pivotal rivet hole 62 and a lower locking rivet hole 64, is visible suspended below the seat frame. Holes 54 are provided for securing the seat frame to the padded seat. Once the lower hinge body 48 is placed with the support legs assembly 20, the upper pivotal rivet 40 and the lower locking rivet 42 are utilized to secure the lower hinge body 48 in place. A carrying strap can be attached to fastener 50.

Figure 18:
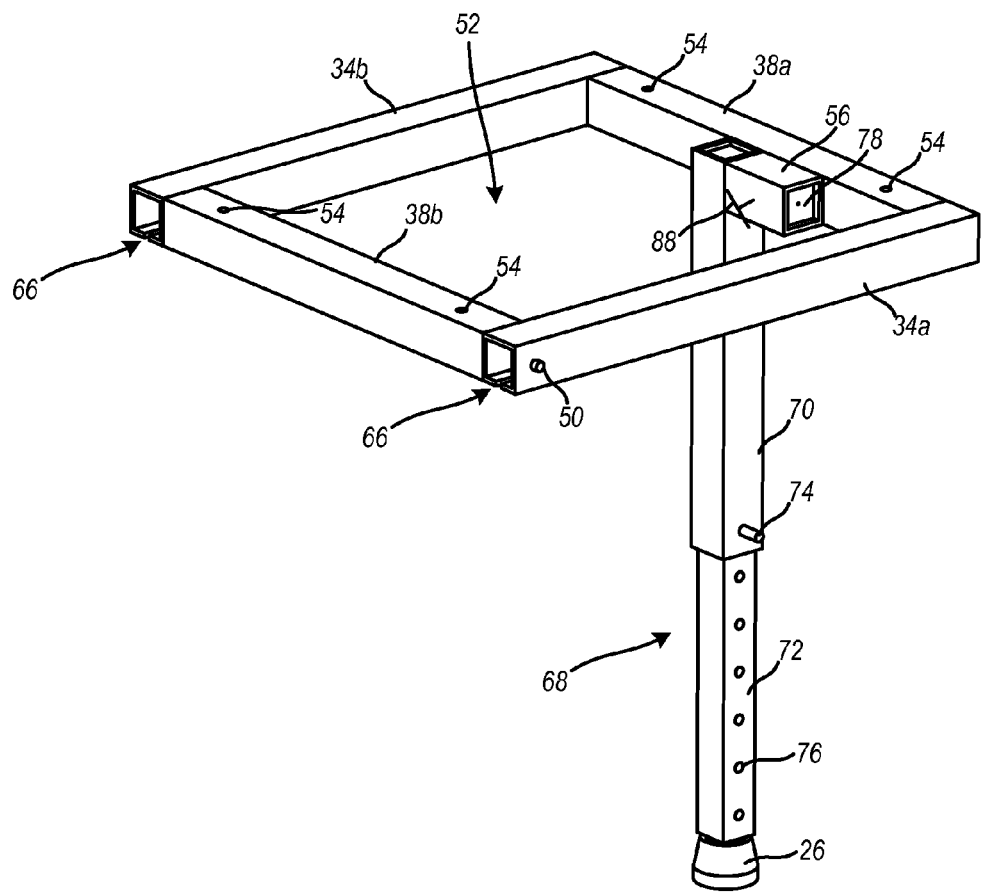
FIG. 18 is a perspective view of the seat support frame of the seat assembly illustrating, in particular, an alternative embodiment utilizing a third extendable leg.
Figure 19:
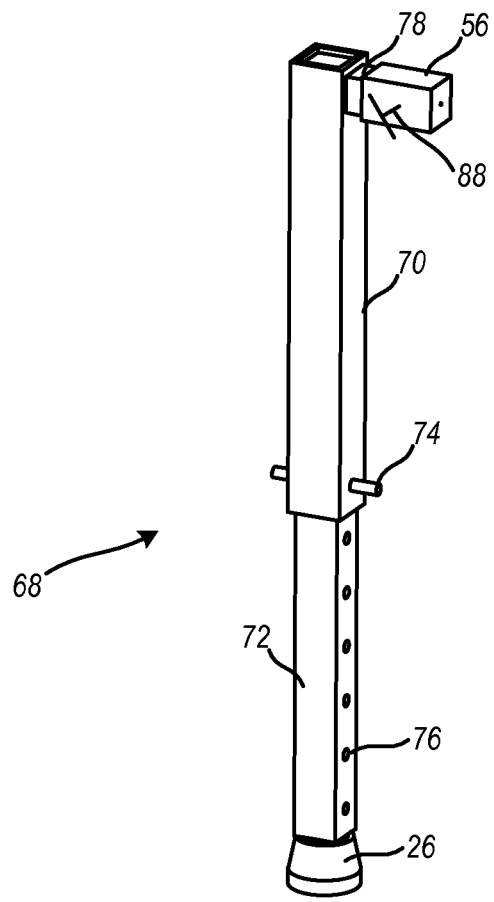
FIG. 19 is a perspective view of the third extendable leg of FIG. 18 illustrating, in particular, a leg stabilizer for secure attachment to the seat support frame of the seat assembly.

Referring now to FIGS. 18 and 19, the frame of seat assembly 30 is shown illustrating, in particular, alternative embodiment utilizing a third leg assembly 68. The third leg assembly 68 is selectively used by an operator to add a third leg 70 when no vertical planar surface is available upon which to support the rear edge of the seat assembly 30 of the stool 10. The third leg assembly 68 includes a leg 70 and a leg extension 72 slidably disposed within the leg 70 and operatively extendable. The third leg assembly 68 includes a hitch pin 74 and hitch pin holes and the leg extension 72 further includes hitch pin holes 76, one of which is selected to receive the hitch pin 74 as it secures the leg 70 and leg extension 72 at a desired height.

The leg assembly 68 further includes a leg stabilizer 78 disposed upon a top of the leg assembly 68 and configured for connectivity with an underside of the seat assembly 30. The seat assembly 30 includes a third leg stabilizer channel 56 into which the leg stabilizer 78 of the third leg assembly 68 is placed either perpendicular to the seat assembly 30 for use as a three-legged stool or parallel to the seat assembly 30 for storage and transport when not in use. The third leg stabilizer channel 56 of the seat assembly 30 further includes a retainer 88 to hold securely the third leg assembly 68 in place. End cap 26 is placed on the foot of leg 70 to prevent slippage.

Figure 20:
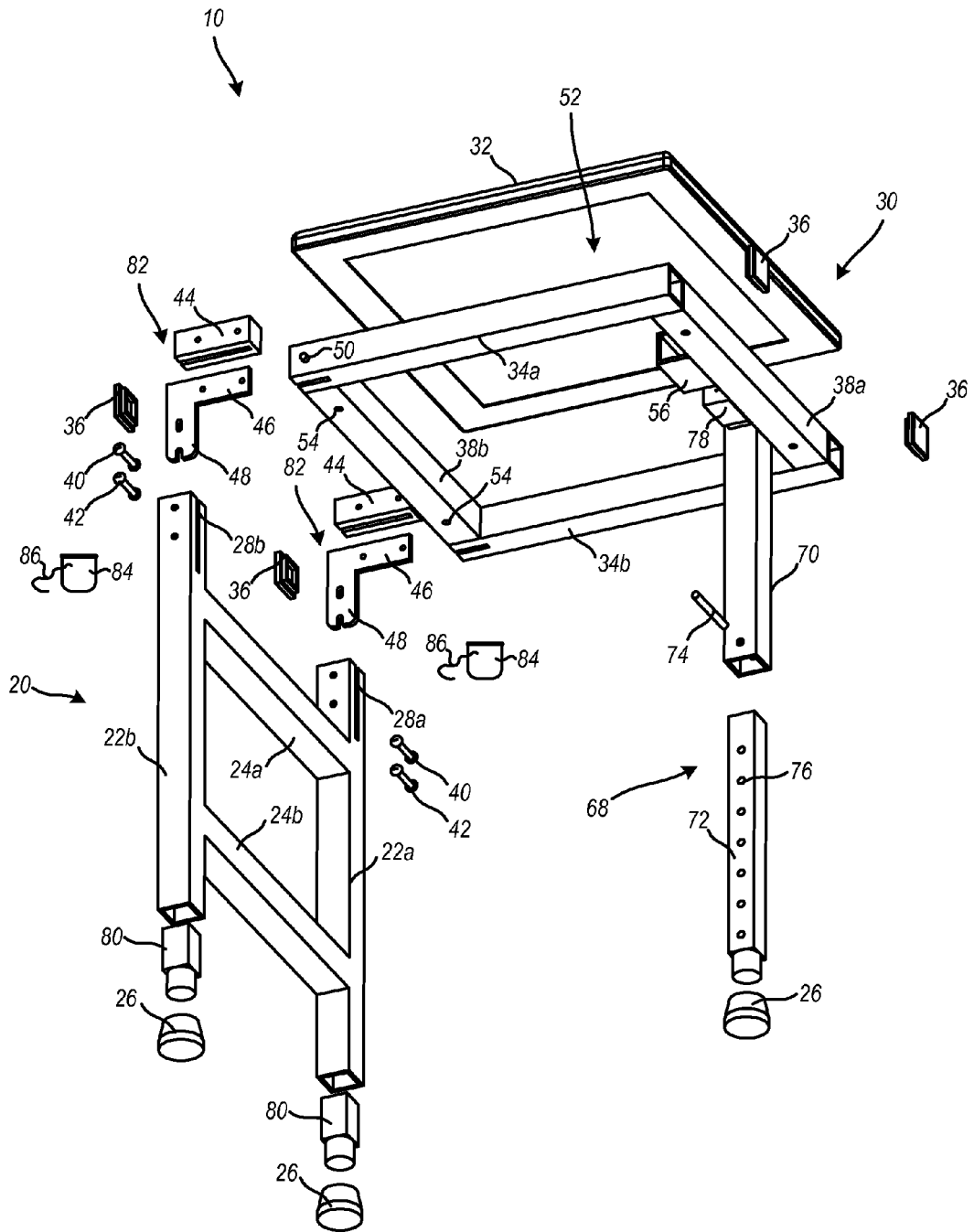
FIG. 20 is an expanded perspective view of the portable, foldable two-legged stool illustrating, in particular, an alternative embodiment utilizing a third extendable leg.
Figure 21:
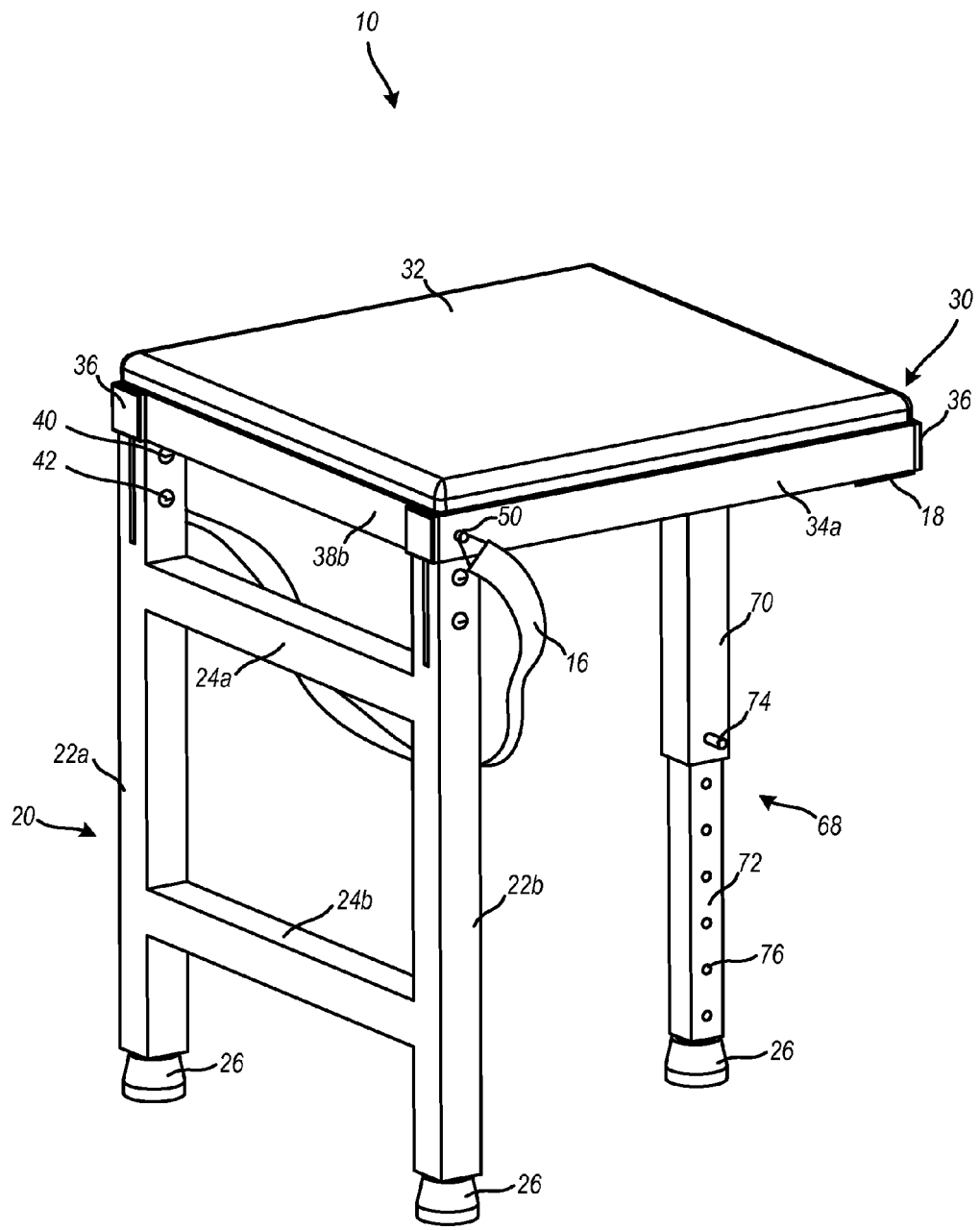
FIG. 21 is a front perspective view of the portable, foldable two-legged stool illustrating, in particular, an alternative embodiment utilizing a third extendable leg.

Referring now to FIGS. 20 and 21, the alternative embodiment of stool 10 utilizing a third leg assembly 68 is shown in an expanded view and an assembled view, respectively. The stool 10 includes a support legs assembly 20 and a seat assembly 30. The support legs assembly 20 includes two parallel support legs 22a, 22b, secured in a support frame having horizontal braces 24a, 24b. The two parallel support legs 22a, 22b include caps 26 and leg filler 80 on the feet to prevent sliding of the support legs assembly 20. Near the top of each support leg 22a, 22b is an upper pivotal rivet 40 and a lower locking rivet 42. The lower locking rivet 42 provides a locking point about which the pivotal hinge assembly 82 locks to hold the stool 10 in place for use to ensure that the stool 10 does not collapse while in use.

The pivotal hinge assembly 82 includes a lower hinge body 48 and an upper hinge body 46 and filler 44 disposed about the upper hinge body 46. Also near the top of each support leg 22*a*, 22*b* is a hollow channel, 28*a*, 28*b*, respectively, passing through the walls of each support leg 22*a*, 22*b* and into which the pivotal hinge assembly 82 slides in to mount for pivoting and locking. Safety hinge cover 84 is utilized to cover the exposed portion of lower hinge body 48 when the stool 10 is in a folded position. A safety hinge cover anchor tie 86 is included to secure the safety hinge cover 84 to the stool 10.

The seat assembly 30 includes a padded seat 32. The seat frame includes four supports, a right side 34*a*, a front 38*b*, a rear 38*a* and a left side 34*b*. At each opposite end of the right side 34*a* and the left side 34*b* is placed a plug 36 to cover the cavity in the hollow tube aluminum and to protect a user from any sharp edges. A fastener 50 is shown on each side 34*a*, 34*b*, whereupon a carrying strap 16 can be attached. Located on both the front 38*b* and rear 38*a* frame supports are seat base holes 54 through which the seat base is secured to the frame supports 38*b*, 38*a* utilizing seat anchor screws or seat anchor bolts. Area 52 in which the seat base is placed is shown within the perimeter of the frame supports 34*a*, 34*b*, 38*a*, 34*b*. The seat assembly 30 also includes a silencer pad 18. The silencer pad 18 is utilized to prevent the seat assembly 30 from slamming into the support legs assembly 20 upon folding or transporting.

The third leg assembly 68 includes a leg 70 and a leg extension 72 slidably disposed within the leg 70 and operatively extendable. The third leg assembly 68 includes a hitch pin 74 and hitch pin holes and the leg extension further includes hitch pin holes 76, one of which is selected to receive the hitch pin 74 as it secures the leg 70 and leg extension 72 at a desired height. The third leg assembly 68 includes a non-slip cap 26. The seat assembly 30 includes a third leg stabilizer channel 56 into which the leg stabilizer 78 of the third leg assembly 68 is placed either perpendicular to the seat assembly 30 for use as a three-legged stool or parallel to the seat assembly 30 for storage and transport when not in use.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A folding stool comprising:
    a support legs assembly having two parallel support legs, each support leg of said two parallel support legs respectively having a foot and an end cap disposed upon a base of each said foot respectively to prevent sliding of the support legs assembly, the folding stool further having a support frame, the support frame comprising the two parallel support legs, an upper horizontal brace and a lower horizontal brace, the upper horizontal brace disposed between and perpendicular to the two parallel support legs, the lower horizontal brace disposed between and perpendicular to the two parallel support legs and disposed below the upper horizontal brace; and
    a seat assembly comprising a left side brace, a right side brace, a front brace and a rear brace collectively forming a square upon which a seat base and a seat pad are disposed and secured, the seat assembly hingedly connected to a top of each of the parallel support legs with a pivotal locking hinge assembly, the folding stool moveable between a collapsed position and an extended position, wherein a major length of each of the two parallel support legs is perpendicular to a major top surface of the seat assembly when in the extended position, and wherein the major length of each of the two parallel support legs is parallel to the major top surface of the seat assembly when in the collapsed position; and
    said pivotal locking hinge assembly comprising a pivotal rivet passing through apertures in at least one of said two parallel legs and through a closed elongated slot in a hinge body secured in the seat assembly, the hinge body further comprising an open elongated slot and said pivotal locking hinge assembly further comprising a locking rivet passing through additional apertures of the at least one of said two parallel legs, wherein the locking rivet is configured to pass through the open elongated slot when in the extended position to lock and maintain the folding stool in the extended position during use, the locking rivet further configured to be removed from the open elongated slot as a direct result of moving the at least one of said two parallel legs to unlock and move the folding stool from the extended position to the collapsed position for transport, wherein said pivotal and locking rivets are configured to maintain the folding stool as locked in the extended position as a rear edge of the seat assembly is positioned against a generally vertical planar surface and a user is sitting on the seat base during use; and
    each of the two parallel support legs comprising a hollow channel configured to receive said pivotal hinge assembly secured to the seat assembly, the support legs assembly and the seat assembly respectively comprising of hollow tube aluminum, and a protective plug is respectively disposed within a cavity at open ends of the seat assembly for sealing.

2. The folding stool of claim 1, further comprising: an adjustable carrying strap connected to the seat assembly of the folding stool and configured for use to carry the folding stool.

3. The folding stool of claim 1, wherein the folding stool is configured to support weight distributed both downwardly through the support legs assembly toward a surface underneath the support legs assembly and horizontally through the seat assembly toward the vertical planar surface.

4. A folding stool comprising:
    a support legs assembly having two parallel support legs, each support leg of said two parallel support legs respectively having a foot and an end cap disposed upon a base of each said foot respectively to prevent sliding of the support legs assembly, the folding stool further having a support frame, the support frame comprising the two parallel support legs, an upper horizontal brace and a lower horizontal brace, the upper horizontal brace disposed between and perpendicular to the two parallel support legs, the lower horizontal brace disposed between and perpendicular to the two parallel support legs and disposed below the upper horizontal brace; and
    a seat assembly comprising a left side brace, a right side brace, a front brace and a rear brace collectively forming a square upon which a seat base and a seat pad are disposed and secured, the seat assembly hingedly connected to a top of each of the parallel support legs with a pivotal locking hinge assembly, the folding stool moveable between a collapsed position and an extended position, wherein a major length of each of the two parallel support legs is perpendicular to a major top surface of the seat assembly when in the extended position, and wherein the major length of each of the two parallel support legs is parallel to the major top surface of the seat assembly when in the collapsed position; and said pivotal locking hinge assembly comprising a pivotal rivet passing through apertures in at least one of said two parallel legs and through a closed elongated slot in a hinge body secured in the seat assembly, the hinge body further comprising an open elongated slot and said pivotal locking hinge assembly further comprising a locking rivet passing through additional apertures of the at least one of said two parallel legs, wherein the locking rivet is configured to pass through the open elongated slot when in the extended position to lock and maintain the folding stool in the extended position during use, the locking rivet further configured to be removed from the open elongated slot as a direct result of moving the at least one of said two parallel legs to unlock and pivot the folding stool from the extended position to the collapsed position for transport, wherein said pivotal and locking rivets are configured to maintain the folding stool locked in the extended position when a rear edge of the seat assembly is positioned against a generally vertical planar surface and a user is sitting on the seat base; and a third leg configured to be attached to the seat assembly to provide support to the rear edge of the seat assembly, each of the two parallel support legs comprising a hollow channel configured to receive said pivotal hinge assembly secured to the seat assembly, the support legs assembly and the seat assembly respectively comprising of hollow tube aluminum, and a protective plug is respectively disposed within a cavity at open ends of the seat assembly for sealing.

5. The folding stool of claim 4, wherein the third leg further comprises a supplemental leg and an extension slidably disposed within the supplemental leg and operatively extendable.

6. The folding stool of claim 5, wherein the supplemental leg further comprises a hitch pin and hitch pin apertures and the extension further comprises a plurality of hitch pin holes configured to receive the hitch pin in order to securely adjust and lock a height of the third leg.

7. The folding stool of claim 5, wherein the third leg further comprises a leg stabilizer disposed upon a top of the third leg and configured for connectivity with an underside of the seat assembly; and wherein the seat assembly further comprises a stabilizer channel configured to receive the leg stabilizer for use or for storage and transport when not in use.

8. The folding stool of claim 7, wherein the leg stabilizer channel of the seat assembly further comprises a retainer to securely hold the third leg in place.

9. The folding stool of claim 4, wherein the third leg further comprises a third leg end cap for contact between the third leg and a ground surface.

10. A method of sitting, the method comprising:
providing the folding stool of claim 1;
unfolding the stool to the extended position and placing the rear edge of the seat assembly against a generally vertical planar surface;
sitting upon the seat assembly;
folding the stool to the collapsed position for transport.

11. A method of sitting, the method comprising:
providing the folding stool of claim 4;
unfolding the stool to the extended position;
connecting the third leg to the seat assembly;
sitting upon the seat assembly;
folding the stool to the collapsed position for transport.

* * * * *